P. A. DOYLE.
ATTACHMENT TO SULKY PLOWS.
APPLICATION FILED JULY 22, 1914.

1,138,546.

Patented May 4, 1915.

Witnesses
Fenton S. Belt
J. W. Sherwood

Inventor
P. A. Doyle
By Franklin H. Hough
Attorney

UNITED STATES PATENT OFFICE.

PATRICK A. DOYLE, OF COPENHAGEN, NEW YORK.

ATTACHMENT TO SULKY-PLOWS.

1,138,546.  Specification of Letters Patent.  Patented May 4, 1915.

Application filed July 22, 1914. Serial No. 852,449.

*To all whom it may concern:*

Be it known that I, PATRICK A. DOYLE, a citizen of the United States, residing at Copenhagen, in the county of Lewis and State of New York, have invented certain new and useful Improvements in Attachments to Sulky-Plows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachments to sulky plows, the object in view being to attach to the usual drop axle shaft of a sulky plow a beam to which a subsoiler is adapted to be attached and provided for the purpose of subsoiling a furrow after the plow has turned the same, thereby loosening up the material underneath the depth at which the furrow is turned and thus affording means for retaining moisture in the soil for use of the growing crop planted upon the ground thus prepared.

More specifically, the present invention consists in the provision of a subsoiler attachment having a beam with offsets or bent portions and adapted to be clamped to the axle of a sulky plow in such a manner that the beam may be raised and lowered similar to the plow and so positioned that the subsoiler will cut in the ground adjacent to the bank from which the furrow has been cut.

Figure 1:
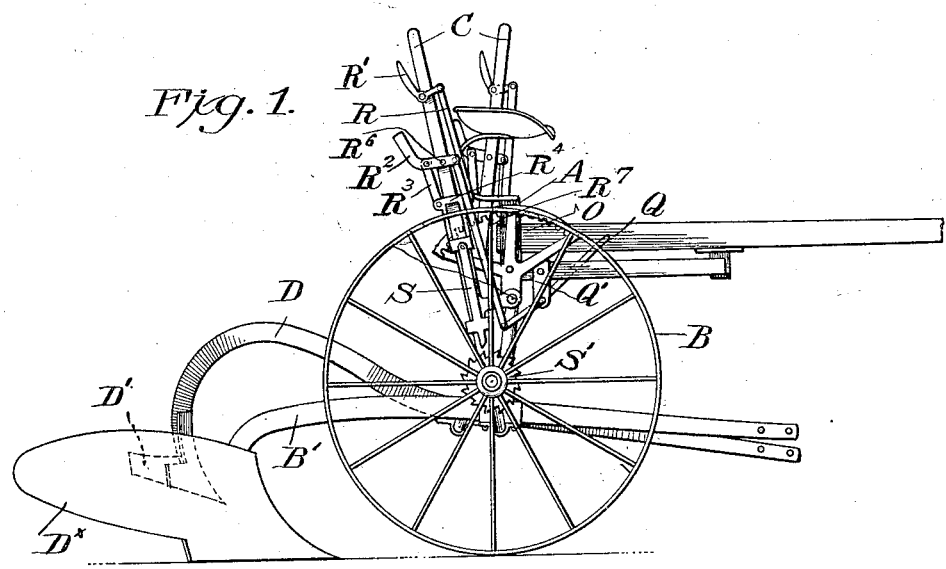
Figure 2:
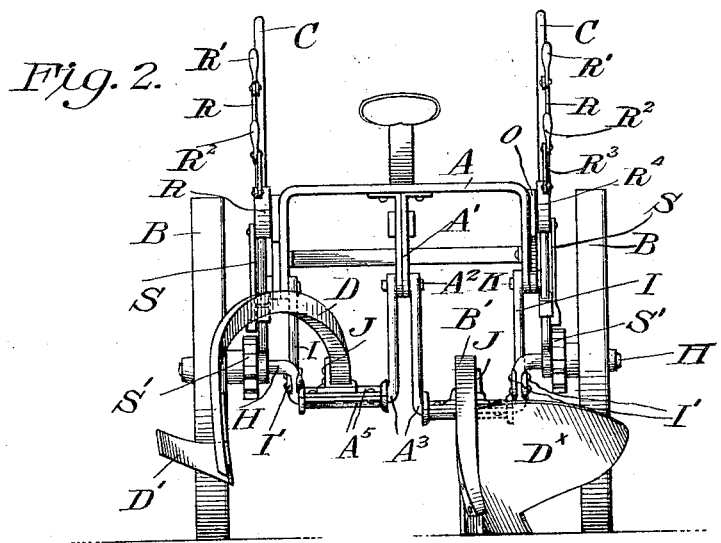
Figure 3:
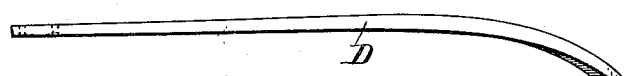

The present invention is illustrated in the accompanying drawings, in which:

Figure 1 is a side elevation of a sulky plow having my improved subsoiler attachment connected thereto. Fig. 2 is a view showing the drop axle tilted to raise the subsoiler, and Fig. 3 is a top plan view of the subsoiler beam.

Reference now being had to the details of the drawings by letter, A designates a yoke forming a part of the frame of the apparatus and $A^3$ designate two complemental crank axles, pivotally connected at their adjacent upper ends upon the bearing $A^2$ and the outer end of each crank axle has a wheel B journaled thereon. A crank arm I is clamped by means of the plates $I'$ to an angled portion of the crank axle $A^3$ and its upper end is pivotally mounted upon a pin K mounted in the lower end of the yoke A. Boxings, designated by letter $A^5$, are fastened together and form bearings for the horizontally disposed portions of the crank axles and to the upper of the boxings $A^5$ an L-shaped plate J projects and to the upright wall of which the beams $B'$ and D are bolted, the beam $B'$ carrying the ordinary plow $D^x$, while the beam D, which forms the subject matter of the present invention, is curved as shown clearly in Fig. 2 of the drawings and its other end positioned in the rear of the left wheel of the plow and has a left hand subsoiler $D'$ secured to its end. Levers C are fastened, one to each crank axle and a segment O is fastened to the frame and has teeth upon its inner marginal edge adapted to be engaged by a pawl carried by the bar R which in turn is pivotally connected to the angle lever $R'$ and affords means whereby, when the pawl is released, the handle C may be swung in order to cause one of the crank axles to rock in its pivotal bearings and tilt the beam carrying the subsoiler or the plow as the case may be.

The mechanism for automatically causing the plow or subsoiler beams to be automatically raised from the ground in the event of an obstruction being struck by the plow or subsoiler point, or for any other reason, consists of a ratchet wheel $S'$ which is fixed to the outer ends of a crank axle and a pawl S for engagement with the teeth of the ratchet wheel, said pawl being pivotally connected to a yoke $R^4$ which in turn is pivotally connected by means of a link $R^3$ with a lever $R^2$ which is pivotally mounted upon a pivot pin $R^6$ and which yoke $R^4$ is also pivotally connected to a link R which in turn is pivoted to the angle lever $R'$ upon the lever C. A tread crank Q is journaled in suitable bearings $Q'$, fastened to the frame, and has pivotal connection with the lower end of a bar $R^7$ which is pivoted at its upper end to the end of the lever $R^2$.

The mechanism for raising and lowering the plow and subsoiler beams as shown and described forms no part of the present invention and is of the common construction employed in a certain type of sulky plow to which the present invention is applicable.

In operation, when it is desired to raise the left hand subsoiler from the ground to the position shown in the drawings, the operator, by releasing the pawl through the medium of the lever R' from the notch in the segment O, may cause the crank axle to which the beam D is fastened to rock to raise the subsoiler and which may be held in position by releasing the pawl to engage another notch in the segment. In the event of the subsoiler being thrown to operative position and striking an obstruction, the operator may, by pressing down upon the crank member Q, cause the same to rock and, through its connection with the pawl S, cause the latter to be thrown into engagement with the ratchet wheel S', thereby causing the handle to rock with the crank and cause the beam D to be quickly thrown to an upright position. After the plow has thrown a furrow of ground, it is the purpose of the present invention to reverse the apparatus and cause the subsoiler to return and cut a second and deeper furrow, thus loosening the subsoiler at considerable depth and better adapting the soil for retaining moisture for germination and growth of grain, etc.

What I claim to be new is:—

In combination with a sulky plow having drop axles with wheels journaled thereon, a plow secured to one of said axles, bearing plates secured to the other axle, an L-shaped member secured to one of said bearing plates, a subsoiler beam having a shank portion which is straight a portion of its length, engaging said L-shaped plate and fastened thereto and curved rearwardly of its point of connection with the plate and extending downwardly in the rear of the adjacent wheel of the beam, a subsoiler projecting laterally from the lower end of the beam and positioned in the furrow in which the adjacent wheel moves, and means for raising and lowering the drop axles.

In testimony whereof I hereunto affix my signature in presence of two witnesses.

PATRICK A. DOYLE.

Witnesses:
G. D. BLODGETT,
B. D. NORTHROP.